(12) United States Patent
Keskitalo et al.

(10) Patent No.: US 10,687,197 B2
(45) Date of Patent: Jun. 16, 2020

(54) TERMINAL DISCOVERY AT A GATEWAY NODE

(71) Applicant: Nokia Technologies Oy, Espoo (FI)

(72) Inventors: Ilkka Keskitalo, Oulu (FI); Zexian Li, Espoo (FI); Mikko Uusitalo, Helsinki (FI); Martti Moisio, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 19 days.

(21) Appl. No.: 15/534,104

(22) PCT Filed: Dec. 12, 2014

(86) PCT No.: PCT/US2014/070139
§ 371 (c)(1),
(2) Date: Jun. 8, 2017

(87) PCT Pub. No.: WO2016/093866
PCT Pub. Date: Jun. 16, 2016

(65) Prior Publication Data
US 2017/0339547 A1 Nov. 23, 2017

(51) Int. Cl.
*H04W 8/00* (2009.01)
*H04W 4/70* (2018.01)
*H04W 4/02* (2018.01)
*H04W 84/04* (2009.01)

(52) U.S. Cl.
CPC ........... *H04W 8/005* (2013.01); *H04W 4/025* (2013.01); *H04W 4/70* (2018.02); *H04W 84/04* (2013.01)

(58) Field of Classification Search
None
See application file for complete search history.

(56) References Cited

U.S. PATENT DOCUMENTS

| | | | |
|---|---|---|---|
| 2008/0062940 A1* | 3/2008 | Othmer | H04W 64/00 370/338 |
| 2009/0234950 A1 | 9/2009 | Wikman et al. | |
| 2013/0212219 A1* | 8/2013 | Koskela | H04W 76/28 709/217 |

(Continued)

FOREIGN PATENT DOCUMENTS

| | | |
|---|---|---|
| EP | 2779717 A1 | 9/2014 |
| JP | 2006-520567 A | 9/2006 |

(Continued)

OTHER PUBLICATIONS

"METIS", METIS2020, Retrieved on Mar. 13, 2018, Webpage available at : https://www.metis2020.com/about-metis/.

(Continued)

*Primary Examiner* — Jeffrey R Swearingen
(74) *Attorney, Agent, or Firm* — Mintz Levin Cohn Ferris Glovsky and Popeo, P.C.

(57) ABSTRACT

In some example embodiments, there is provided a method. The method may include determining whether a communication terminal is within range of a wireless gateway to enable connection establishment between the wireless gateway and the communication terminal; and establishing at least one connection between the wireless gateway and the communication terminal, when the communication terminal is determined to be within range. Related systems, methods, and articles of manufacture are also described.

20 Claims, 4 Drawing Sheets

(56) References Cited

U.S. PATENT DOCUMENTS

2014/0242983 A1    8/2014    Chang et al.

FOREIGN PATENT DOCUMENTS

| WO | 2004/082185 A2 | 9/2004 |
| WO | WO 2011081705 | 7/2011 |
| WO | WO 2011150757 | 8/2011 |
| WO | 2012/052598 A1 | 4/2012 |

OTHER PUBLICATIONS

"Deliverable D6.3 Intermediate System Evaluation Results", Mobile and wireless communications Enablers for the Twenty twenty Information Society (METIS), ICT-317669-METIS/D6.3, 2014, 131 pages.

"3rd Generation Partnership Project; Technical Specification Group Radio Access Network; Small cell enhancements for E-UTRA and E-UTRAN—Physical layer aspects (Release 12)", 3GPP TR 36.872, V12.1.0, Dec. 2013, pp. 1-100.

"3rd Generation Partnership Project; Technical Specification Group Radio Access Network; Study on Small Cell enhancements for E-UTRA and E-UTRAN; Higher layer aspects(Release 12)", 3GPP TR 36.842, V12.0.0, Dec. 2013, pp. 1-71.

Office action received for corresponding Japanese Patent Application No. 2017-530225, dated Feb. 28, 2018, 4 pages of office action and 4 pages of translation available.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.3.0 (Mar. 2016), pp. 1-295.

International Search Report and Written Opinion received for corresponding Patent Cooperation Treaty Application No. PCT/US2014/070139 dated Aug. 15, 2015, 12 pages.

Geier J: "802.11 Beacons Revealed", Internet Citation, Oct. 31, 2002, pp. 1-6, XP008117149.

Office Action received for corresponding European Patent Application No. 14827608.2, dated May 31, 2018, 5 pages.

\* cited by examiner

TERMINAL DISCOVERY AT A GATEWAY NODE

RELATED APPLICATION

This application was originally filed as Patent Cooperation Treaty Application No. PCT/US2014/070139 filed Dec. 12, 2014.

FIELD

The subject matter described herein relates to wireless communications.

BACKGROUND

Machine-to-machine communications, also referred to as M2M communications or machine-type communications (MTC) is increasing in usage and is expected to further increase in popularity. The applicability of MTC includes a variety of applications including smart grid, home networking, connected health care, vehicular networking including driverless cars, and so forth. To that end, METIS is evaluating massive machine communications (MMC), and is including MTC as part of the future of cellular systems, such as 5G systems and beyond.

SUMMARY

In some example embodiments, there is provided a method for terminal discovery. The method may include determining whether a communication terminal is within range of a wireless gateway to enable connection establishment between the wireless gateway and the communication terminal; and establishing at least one connection between the wireless gateway and the communication terminal, when the communication terminal is determined to be within range.

In some variations, one or more of the features disclosed herein including the following features can optionally be included in any feasible combination. The wireless gateway may perform the determining and the establishing. The communication terminal may perform the determining and the establishing. The communication terminal may include a machine-type communication terminal. The determining whether the communication terminal is within range may further include detecting a beacon signal emitted by at least one of the communication terminal or the wireless gateway. The beacon signal may include a predefined signal recognized, by the communication terminal and the wireless gateway, to provide gateway discovery. The beacon signal may carry at least one of data or control information. The determining whether the communication terminal is within range further may further include accessing geo-positioning information representative of a location of the machine-type communication terminal or the wireless gateway. The beacon signal may be emitted, when performing at least one of the determining or the establishing. The beacon signal may be emitted, when triggered by a timer to perform at least one of the determining or the establishing. The determining may further include determining whether the wireless gateway is within range of the communication terminal based on at least one of a cell identifier, a radio frequency fingerprint, a wireless local area network identifier, or geo-positioning information. The at least one connection may be established proactively, by the wireless gateway, before the at least one connection is needed for transmission of available data. The at least one connection may be established reactively, when the at least one connection is needed for transmission of available data. The wireless gateway may include at least one of a user equipment or a mobile user equipment. The wireless gateway may provide at least one of access to another network, access to the internet, access to a service at the wireless gateway, or access to another service at a remoter server. The wireless gateway may authenticate a plurality of communication terminals to form a group.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Figure 1:
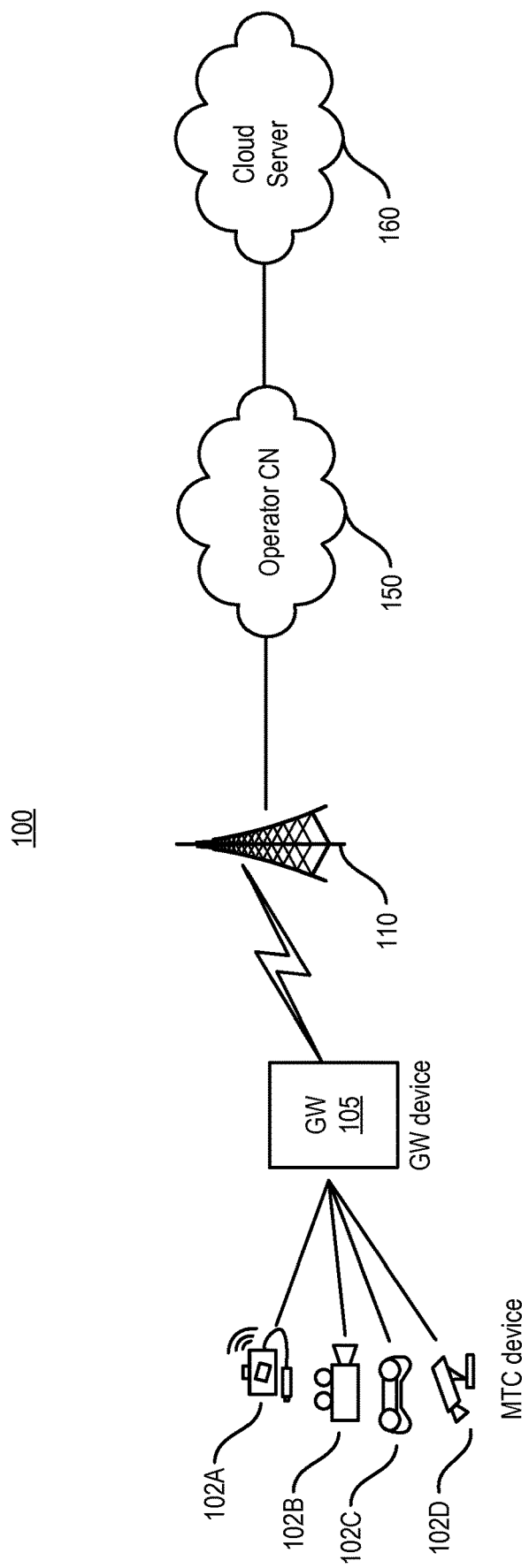
FIG. 1 depicts an example of a system including machine-to-machine communication devices and a gateway, in accordance with some example embodiments.

Like labels are used to refer to the same or similar items in the drawings.

DETAILED DESCRIPTION

The subject matter disclosed herein may provide, in some example embodiments, a way to detect the availability of a gateway for use by machine-type communications (MTC) devices, for communication and/or for access to services.

FIG. 1 depicts an example system 100 including one or more MTC devices 102A-D, such as a camera, a video camera, a gaming console, a sensor, an actuator, a user equipment, and/or any other device/machine/terminal. The MTC devices may operate within the Internet of Things (IoT). Moreover, the MTC devices may, in some example embodiments, have limited processing power, communication, and/or memory capabilities at least with respect to MTC's wireless circuitry that enables communication among MTC devices and/or with a gateway or gateways. The MTC devices may be mobile in some example embodiments (although a fixed MTC device may be implemented as well).

MTC devices 102A-D may couple wirelessly to a gateway 105, and some of the communications links (for example, connections) between an MTC device and a gateway may not be dedicated or continuous (for example, communication connections established in an ad-hoc manner, reactively or proactively). Moreover, gateway (gateway) 105 may wirelessly couple to an access point 110, such as a base station 110, a WiFi access point, another radio, and/or the like, that provides access to another network 150, such as a carrier network, the Internet, and/or any other type of network. The other network may provide access to a cloud server 160.

To illustrate, one or more MTC devices 102A-D may be part of a group of devices in a network, such as a home network or an industrial network framework. The MTC devices 102A-D may connect to gateway 105 in order to access a connection to for example the Internet and/or access services, such as services at the gateway or services at a cloud server 160.

Given that a gateway may be mobile and/or that the radio connection between the gateway and the MTC device may be non-continuous, there may be a need for a reliable and efficient way to establish/re-establish a connection between the gateway and MTC device whenever data transfer is required and/or whenever the gateway is in the vicinity of MTC device. This may enable data collection data from the MTC devices/terminals for either forwarding the data, processing it, and/or providing services (including executing control functions which may be based on input data from the MTC devices/terminals).

In some example embodiments, there is provided, as noted above, a way to detect whether the gateway is available to the MTC device(s) in order to provide communications and/or services.

In some example embodiments, gateway 105 may be implemented as a mobile wireless node. For example, gateway 105 may be implemented as user equipment, such as a cellular phone, a tablet, a smart phone, a wireless access point, and/or the like. Moreover, gateway 105 may include dedicated gateway functionality as disclosed herein and/or be configured (for example, via an application that is downloaded or otherwise installed on the gateway) to have the gateway functionality disclosed herein.

In some example embodiments, gateway 105 may authorize and authenticate one or more MTC devices, and the authorization and authentication may include group creation of MTC devices (for example, to enable the MTC devices to communication with and via the gateway).

In some example embodiments, connections between the MTC devices and gateway may be established, as noted above, in an ad-hoc manner, whenever a wireless communication connection is available, feasible, and/or needed. Moreover, the discovery of a communication connection and/or the connection establishment may also be either pro-active (for example, discovery and/or connection establishment prior to data transmission by the MTC device) or reactive (for example, discovery and/or connection establishment when data arrives for transmission by the MTC device).

When gateway 105 is be outside the coverage area of the MTC devices due to mobility of the MTC devices or the gateway itself, connection establishment may not be possible until gateway 105 is within/inside the coverage area of the MTC devices. In the case of mobile MTC devices that are moving/mobile, the availability of a wireless connection may depend on the location of the MTC device and the corresponding gateway.

In some example embodiments, gateway 105 may provide to coupled MTC devices a data connection to other networks and may provide access to remote services, such as cloud service 160. In addition, gateway 105 may provide to coupled MTC devices local services including data collection, control functions, and the like. For example, a local service may collect sensor data, such as temperature, from MTC devices. The gateway may then perform as a control function, such as control a heater, ventilation, and/or the like. In the case of locally collected data, the gateway may forward locally collected data (which may include pre-processing) of the locally collected data) to cloud server 160 via another wireless connection for example wide area and/or cellular connections. The gateway may include other functions as well including showing relevant information to the end-user, checking if certain information requires actions (for example, alerting), analyzing the data with possible control operations, and/or the like.

In some example embodiments, gateway 105 may sense if one or more MTC devices are near the gateway and sufficiently close to establish at least one wireless connection. The sensing by the gateway may be performed in a variety of ways. For example, the MTC device may emit a signal, such as a beacon, that is detected by the gateway. Alternatively or additionally, the gateway may emit a signal, such as a beacon, that can be detected by an MTC device, which then responds to the gateway (for example, with another beacon, signal, message, control signal, and/or the like that can be received by the gateway). In some example embodiments, a gateway may recognize its location as being in an area where MTC devices are located. This recognition may be performed based a geo-positioning information, a cell identifier, a radio frequency fingerprint (which may correspond to a certain location), a wireless local area network identifier, and/or the like. In the case of beacons, the gateway or MTC device may initiate beacon transmission periodically, continuously, after sensing the possibility of a corresponding available device for communication link establishment, which may be proactive and/or reactive.

The following provides some example embodiments with respect to detection of gateway availability for communication and services for use by MTC devices.

In some example embodiments, gateway 105 may initiate transmission of a beacon signal based on location, when the MTC devices are known to be near the gateway or sensed to be near the gateway. Alternatively or additionally, the gateway may initiate transmission of the beacon signal based on time information (for example, a timer that triggers a check for MTC connection availability), in accordance with some example embodiments. In some example embodiments, the beacon signal transmitted by the gateway and/or MTC device as part of the detection process may be activated only for detection/discovery of the presence of the gateway and availability of the wireless connection(s) between MTC devices. Furthermore, the beacon signal may be a predefined signal known by the MTC device and the gateway as a signal used for detection or discovery of gateway availability (although the beacon signal may carry other information including control signaling as well). Moreover, the data transmission may take place on a need basis any time a wireless connection is available (which may be independent to the gateway discovery).

In some example embodiments, gateway 105 may initiate a discovery function, when data arrives for transmission to an MTC and a wireless connection needs to be established. In some example embodiments, a beacon transmission at the gateway is triggered by the data arrival. The discovery may be via a reactive method that establishes communications to one or more MTC devices in reaction (or response) to the data arrival, although communication establishment may be proactive (for example, where communication establishment is performed before the data arrival) as well.

Figure 2:
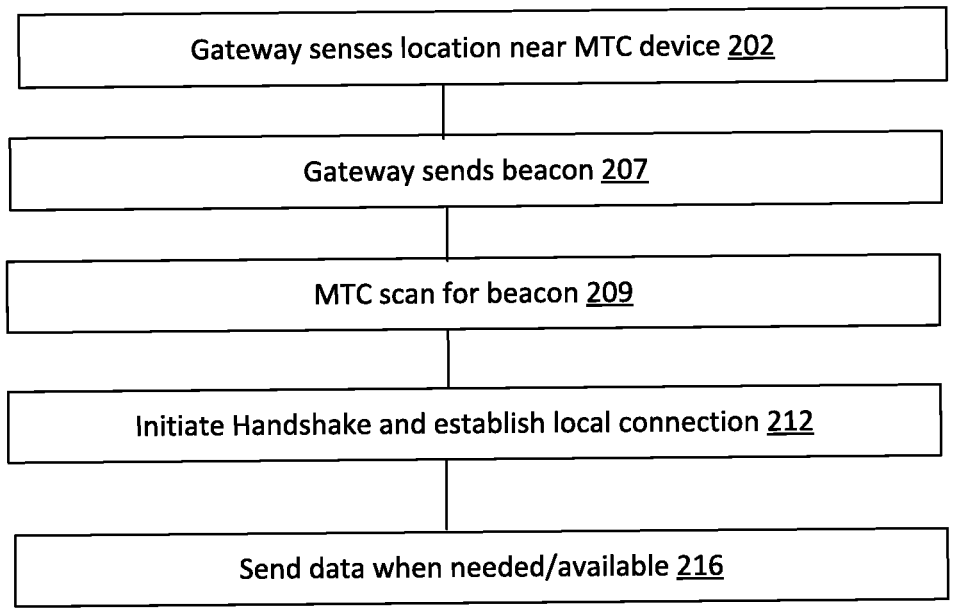
FIG. 2 depicts an example of a process for gateway discovery, in accordance with some example embodiments.

FIG. 2 depicts an example process 200 for a proactive discovery, in accordance with some example embodiments. The proactive discovery process refers to establishing the MTC and gateway connection(s) before the connection(s)

are needed due to the arrival of data to be transmitted. The description of FIG. 2 also refers to FIG. 1.

At 202, a gateway may sense the location to be close to the MTC devices, without regard to whether there is data to be transmitted to the MTC devices or not, in accordance with some example embodiments. For example, gateway 105 may sense that it is in the vicinity of MTC devices 102A-B and proceed with process 200 without there being an immediate need for data connectivity due to the arrival of data for transmission (or reception from) the MTC device(s). The sensing by the gateway may be performed in a variety of ways, as noted above.

When the gateway senses the location, the gateway may send, at 207, a beacon signal in order to "advertise" the presence of the gateway near one or more MTC devices, in accordance with some example embodiments. For example, gateway 105 may sense at 207, that based on the gateway's location, there are likely one or more MTC devices (or a group of MTC devices), and as a result transmit a beacon, such as a WiFi beacon and/or any other type of beacon. The beacon may include identification information for the gateway, so that an MTC device can respond. The beacon may also be predefined so that the MTC device recognizes that the beacon signal corresponds to the gateway discovery process disclosed herein.

Meanwhile, MTC devices may scan, at 209, for a beacon, in accordance with some example embodiments. The scanning by an MTC device may be continuous, periodic, and/or performed aperiodic as well, wherein aperiodic may be based on relative or absolute time (for example, time of the day). Moreover, the scanning by an MTC device may be triggered by an event, such as the data that needs to be transmitted, when a predefined threshold of a measured quantity is exceeded (for example, triggering an alarm) and/or the like. For example, MTC devices 102A may scan for the beacon transmitted by gateway 105 by listening on one or more frequencies for the beacon.

When the beacon is detected at 209, an MTC device may then choose to establish a connection, at 212, by initiating a connection establishment phase (for example, a handshake and/or the like) with the gateway, in accordance with some example embodiments. The connection establishment may include also an authentication procedure in order to allow only connections to a certain group of MTC terminals/devices. When the connection is established proactively, MTC device may send, at 216, data to the gateway whenever there is a need for data to be sent to the gateway or the MTC device requires access to a service at the gateway or cloud server.

In some example embodiments, gateway beaconing, at 207, may allow downlink data from the gateway to the MTC device. Moreover, the beacon signal may be used, as noted, to provide control signaling toward the MTC devices. Moreover, the gateway may, in some example embodiments, poll the MTC devices to send any available data. For example, the beacon signal may be used to poll each of the MTC devices to send data to the gateway. Furthermore, the MTC devices 102A-D may be grouped, as noted above, although MTC devices 120A-D may interact individually as well with gateway 105. In some example embodiments, the gateway may initiate transmission of the beacon signal at 207 based on time information as noted above.

Although the previous example describes the beacon transmission initiated by the gateway, an MTC device may trigger a beacon transmission at the gateway as well. For example, an MTC device may initiate beacon transmission, and the transmission may be triggered by a timer and/or an event at the MTC device. Examples of events include an alarm signal, a measurement value exceeding/going below a certain threshold, and/or the like.

Figure 3:
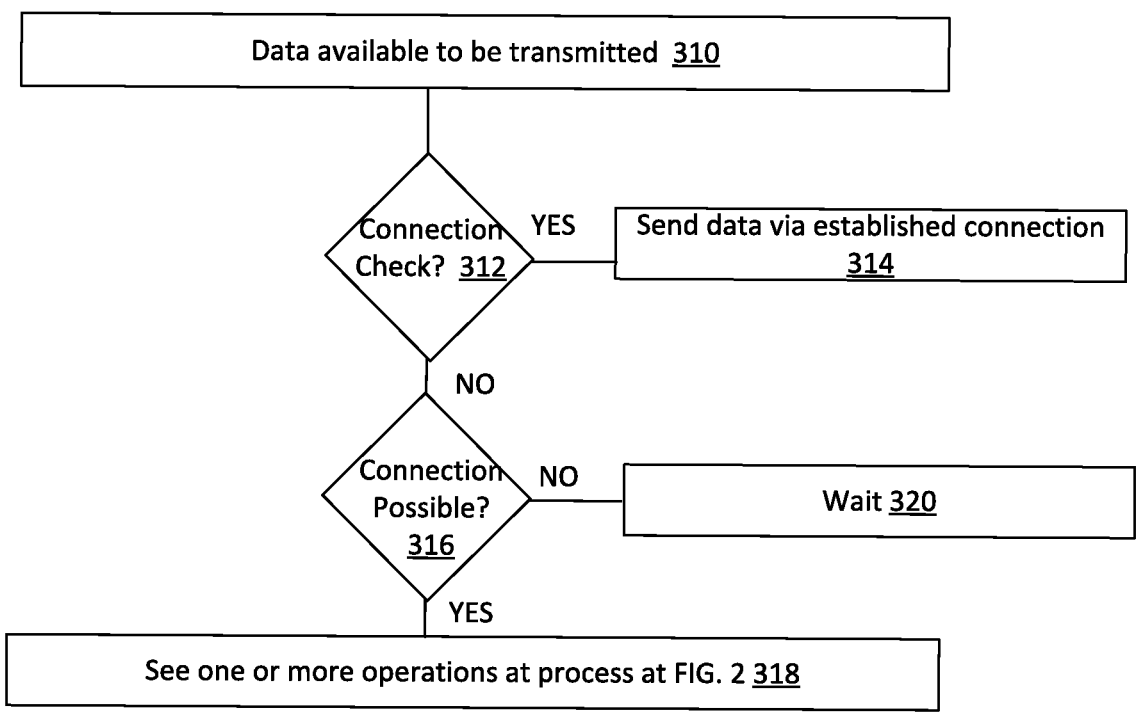
FIG. 3 depicts another example of a process for gateway discovery, in accordance with some example embodiments.

FIG. 3 depicts an example process 300 for reactive discovery, in accordance with some example embodiments. The reactive discovery process refers to establishing the MTC and gateway connection(s) in response to data arriving (or needing to be sent) to for example the gateway. Beacon transmission may be triggered by the data arrival (or needing to be sent). Moreover, the gateway may transmit a beacon, and the beacon may carry control information and/or downlink data for one or more MTC device(s), although an MTC device may transmit a beacon as well (which may also carry control and/or uplink data as well). Furthermore, the beacon may be a predetermined signal recognized by the gateway and MTC devices. In addition, gateway discovery may utilize, among other things, location information. Moreover, beacon transmission/data transfer initiation may be dependent upon the gateway location or on MTC device(s) location. The description of FIG. 3 also refers to FIG. 1.

When data arrives (or needs to be sent from the MTC device to gateway) for transmission at 310, a check is performed reactively, at 312 for the availability/possibility of a connection between the MTC device and the gateway, in accordance with some example embodiments. If a connection has been established (yes at 312), the MTC device may send data at 314 over that connection to the gateway.

However, if the connection has not been established (no at 312), a determination is performed, at 316, to determine whether it is possible to establish a connection between the MTC device and an available gateway. To determine whether it is possible to establish the MTC-to-gateway connection, one or more factors may be considered including gateway location, MTC location, time, and/or other relevant parameters including the sensed parameters noted above.

If it is determined that it is possible to establish a connection between the MTC device and an available gateway (yes at 316 and 318), then one or more operations described above with respect to process 200 can be used to establish the connection between the MTC device and the gateway. If it is determined that it is not possible to establish a connection between the MTC device and the gateway (no at 316 and 320), then the MTC device and/or gateway may wait until conditions change.

To illustrate process 300 further, the gateway may have, at 310, data that is to be transmitted to one or more of the MTC device(s). When this is the case, the gateway may check, at 312, for an available wireless connection to the MTC device(s). If the connection is not available, the gateway may determine whether the connection(s) to the MTC device(s) are possible based on location, time, and/or other relevant parameters. If so, the connections are established at 318, and, if not, the gateway waits at 320.

In the case of the MTC device, when data arrives at the MTC device, and that data needs to be sent to or via the gateway, the MTC device may check, at 312, for an available wireless connection to the gateway. If the connection is not available, the MTC device may determine whether the connection(s) to the gateway is even possible based on location, time and/or other relevant parameters. If so, the connections are established at 318, and, if not, the MTC waits at 320.

When the data has been successfully sent, the connection may be available for a certain time period after which a re-active process may be initiated whenever new data arrives. For example, the time period to maintain the availability of a connection can depend on the service, connection type (for example, traffic/signaling), terminal type, gateway instruction (for example, separate control signaling) or the like. The time period can be 0 seconds or any other value greater than 0 seconds.

In some example embodiments, the MTC device and/or gateway may need to determine its location to determine whether to activate a discovery beacon transmission or establish a connection. When this is the case, the location detection can be based on a global satellite navigation system positioning (for example, global positioning system (GPS) fixes, which are made available by a GPS chipset).

Alternatively or additionally, the location may be determined based on cell identity. Although the resolution is at cell level, this may be sufficient (for example, with a home base station or other small cell base station/evolved node B base station (eNB)), the coverage of home base station may be on the order of the radio coverage of the gateway and MTC device local area connection.

Alternatively or additionally, the location detection may be based on cells received. For example, radio frequency (RF) fingerprinting may be used to identify a location. For example, RF fingerprinting may identify a specific cell, their relative or absolute signal levels and thus location. Moreover, the location determination may be also based on a sequence of cell changes. For example, when a device travels a given route, such as from work to home, the sequence of cells along the route including the destination may be predicted. As such, the location (for example, the arrival at a certain location in this example), may thus be determined based on cell IDs, time, or other parameters related to movement within/among the cells.

Alternatively or additionally, the location the location may be determined based on a reception of other local area signals, such as wireless local area network specific identification (SSID) or Bluetooth-Low Energy (BT-LE) beaconing. The local area signal may be different from the wireless connection that is used between the gateway and sensors/MTCs assuming that the beaconing has not been started and the initiation is based on location trigger.

Alternatively or additionally, the location may be determined based on the gateway contacting a given database or service to collect relevant information about MTC devices in order to trigger an application or launch a service. For example, a user may enter a shopping mall, where an application is launched, and the application contacts a server get relevant information about local MTC devices. If present, the synchronization to MTC devices can be initiated.

Alternatively or additionally, the location determination may be based on a user input. For example, a user may, when entering a known location, enter an indication to activate beaconing (or a service that the gateway/MTC device is used for). In this example, a third party may trigger where some external function triggers the beaconing. As an example, if a boat is approaching a harbor, there may be a manual launch of a network of MTC devices to be contacted when at the harbor.

Figure 4:
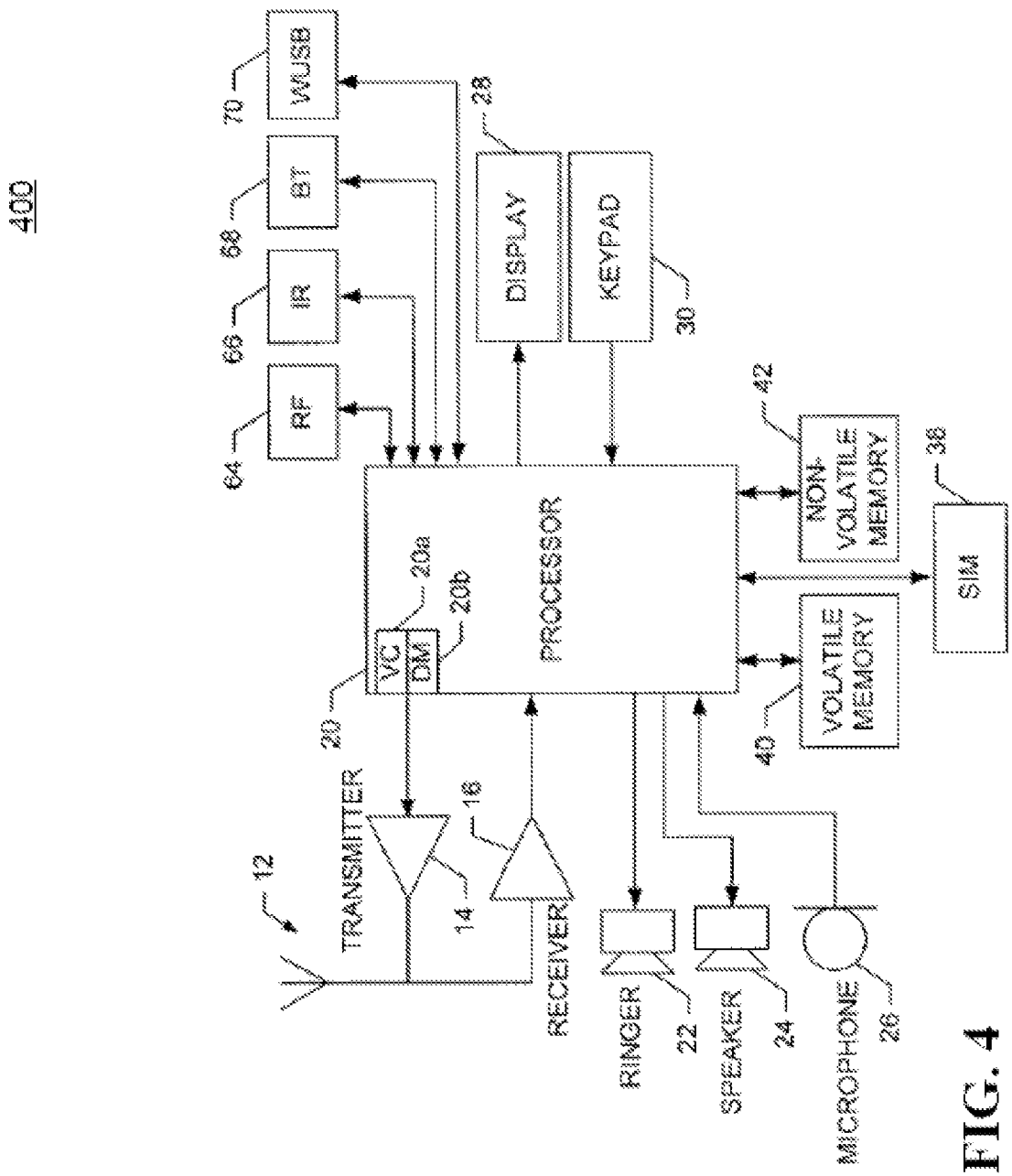
FIG. 4 an example of an apparatus, in accordance with some example embodiments.

FIG. 4 depicts an example of an apparatus 400, in accordance with some example embodiments. The apparatus 400 may comprise a user equipment that can provide the MTC device or gateway. The user equipment may be implemented as a smart phone, a cell phone, an Internet of Things sensor/actuator, a wearable radio device, a camera, a video camera, a gaming console, and/or any other radio-based device Moreover, the MTC devices may, in some example embodiments, have limited processing, power, communication, and/or memory capabilities at least with respect to wireless circuitry that enables communication among MTC devices and/or with a gateway or gateways. For example, a camera may include an MTC sensor to collect and transmit data to a service (where the image data can be stored and/or processed). In this example, the camera's wireless circuitry may be configured to have limited processing, power, communication, and/or memory capabilities, when compared to for example a smart phone or tablet.

In some example embodiments, apparatus 400 may also include a radio communication link to a cellular network, or other wireless network. The apparatus 400 may include at least one antenna 12 in communication with a transmitter 14 and a receiver 16. Alternatively transmit and receive antennas may be separate.

The apparatus 400 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 130 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 400 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 400 may be capable of operating with one or more air interface standards, communication protocols, modulation types, access types, and/or the like. For example, the apparatus 400 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 400 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 400 may be capable of operating in accordance with 2.5G wireless communication protocols General Packet Radio Service (GPRS), Enhanced Data GSM Environment (EDGE), and/or the like. Further, for example, the apparatus 400 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 130 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 400 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 400. For example, the processor 20 may comprise a digital signal processor device, a microprocessor device, an analog-to-digital converter, a digital-to-analog converter, and/or the like. Control and signal processing functions of the apparatus 400 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 400 to perform actions. For example, processor 20 may be capable of operating a connectivity program, such as, a web browser. The connectivity program may allow the apparatus 400 to transmit and receive web content, such as location-based content, according to a protocol, such as, wireless application protocol, wireless access point, hypertext transfer protocol, HTTP, and/or the like.

Apparatus 400 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 400 may include a battery for powering various circuits related to the mobile terminal, for example, a circuit to provide mechanical vibration as a detectable output. The user input interface may comprise devices allowing the apparatus 400 to receive data, such as, a keypad 30 (which can be a virtual keyboard presented on display 28 or an externally coupled keyboard) and/or other input devices.

Moreover, the apparatus 400 may include a short-range radio frequency (RF) transceiver and/or interrogator 64, so data may be shared with and/or obtained from electronic devices in accordance with RF techniques. The apparatus 400 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 400 and, in particular, the short-range transceiver may be capable of transmitting data to and/or receiving data from electronic devices within a proximity of the apparatus, such as within 10 meters. The apparatus 400 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 400 may comprise memory, such as, a subscriber identity module (SIM) 38, a removable user identity module (R-UIM), and/or the like, which may store information elements related to a mobile subscriber. In addition to the SIM, the apparatus 400 may include other removable and/or fixed memory. The apparatus 400 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing process 200, 300, and/or the like. The memories may comprise an identifier, such as an international mobile equipment identification (IMEI) code, capable of uniquely identifying apparatus 400. The functions may include one or more of the operations disclosed herein including determining whether a communication terminal is within range of a wireless gateway to enable connection establishment between the wireless gateway and the communication terminal and establishing at least one connection between the wireless gateway and the communication terminal, when the communication terminal is determined to be within range, for example. The memories may comprise an identifier, such as an international mobile equipment identification (IMEI) code, capable of uniquely identifying apparatus 400. In the example embodiment, the processor 20 may be configured using computer code stored at memory 40 and/or 42 to provide the operations, such as process 200, 300, and/or the like.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process 200, 300, and the like).

Without in any way limiting the scope, interpretation, or application of the claims appearing below, a technical effect of one or more of the example embodiments disclosed herein is a way to establish the wireless connection between the gateway and terminals whenever that connection is feasible. Without in any way limiting the scope, interpretation, or application of the claims appearing below, a technical effect of one or more of the example embodiments disclosed herein is reduced power consumption when the connection (attempts) happen only when the probability of having wireless connection with sufficient quality is highest. Without in any way limiting the scope, interpretation, or application of the claims appearing below, a technical effect of one or more of the example embodiments disclosed herein is reduced power consumption of MTC devices, which may have reduced power capabilities when compared to other devices, such as smart phones and the like).

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:

determining, at a communication terminal and in response to detecting that a measurement value is above a threshold value, that the communication terminal is within range of a wireless gateway to enable connection establishment between the wireless gateway and the communication terminal;

transmitting, by the communication terminal and to the wireless gateway, a signal for gateway discovery in response to the determining that the communication terminal is within range of the wireless gateway; and establishing at least one connection between the wireless gateway and the communication terminal, in response to the determining that the communication terminal is within range of the wireless gateway.

2. The method of claim 1, wherein the determining that the communication terminal is within range of the wireless gateway further comprises:

detecting a beacon signal emitted by at least one of the communication terminal or the wireless gateway.

3. The method of claim 2, wherein the beacon signal comprises a predefined signal recognized, by the communication terminal and the wireless gateway, to provide gateway discovery.

4. The method of claim 2 wherein the beacon signal carries at least one of data or control information.

5. The method of claim 1, wherein the determining that the communication terminal is within range of the wireless gateway further comprises:

accessing geo-positioning information representative of a location of the communication terminal or the wireless gateway.

6. The method of claim 2 further comprising:

emitting the beacon signal, when performing at least one of the determining or the establishing.

7. The method of claim 2 further comprising:

emitting the beacon signal, when triggered by a timer to perform at least one of the determining or the establishing.

8. The method of claim 1, wherein the determining further comprises: determining that the communication terminal is within range of the wireless gateway based on at least one of a cell identifier, a radio frequency fingerprint, a wireless local area network identifier, or geo-positioning information.

9. The method of claim 1, wherein the wireless gateway provides at least one of access to another network, access to the internet, access to a service at the wireless gateway, or access to another service at a remote server.

10. The method of claim 1, wherein the wireless gateway authenticates a plurality of communication terminals to form a group.

11. An apparatus comprising:
at least one processor; and
at least one memory including computer program code, the at least one processor, the at least one memory, and the computer program code configured to cause the apparatus to at least:
  determine, in response to detecting that a measurement value is above a threshold value, that the apparatus is within range of a wireless gateway to enable connection establishment between the wireless gateway and the apparatus;
  transmit, to the wireless gateway, a signal for gateway discovery in response to the apparatus being determined to be within range of the wireless gateway; and
  establish at least one connection between the wireless gateway and the apparatus, in response to the apparatus being determined to be within range of the wireless gateway.

12. The apparatus of claim 11, wherein the apparatus is further configured to at least detect a beacon signal emitted by the wireless gateway.

13. The apparatus of claim 12, wherein the beacon signal comprises a predefined signal recognized, by the apparatus and the wireless gateway, to provide gateway discovery.

14. The apparatus of claim 11, wherein to determine that the apparatus is within range of the wireless gateway, the apparatus is further configured to at least access geo-positioning information representative of a location of the apparatus or the wireless gateway.

15. The apparatus of claim 11, wherein the apparatus is further configured to at least emit a beacon signal, when performing at least one of the determination or the establishment.

16. The apparatus of claim 15, wherein the apparatus is further configured to at least emit the beacon signal, when triggered by a timer to perform at least one of the determination or the establishment.

17. The apparatus of claim 11, wherein the apparatus is further configured to at least determine that the apparatus is within range of the wireless gateway based on at least one of a cell identifier, a radio frequency fingerprint, a wireless local area network identifier, or geo-positioning information.

18. The apparatus of claim 11, wherein the wireless gateway comprises at least one of a user equipment or a mobile user equipment.

19. The apparatus of claim 11, wherein the wireless gateway provides at least one of access to another network, access to the internet, access to a service at the wireless gateway, or access to another service at a remote server.

20. The apparatus of claim 11, wherein the wireless gateway authenticates a plurality of communication terminals to form a group.

* * * * *